UNITED STATES PATENT OFFICE.

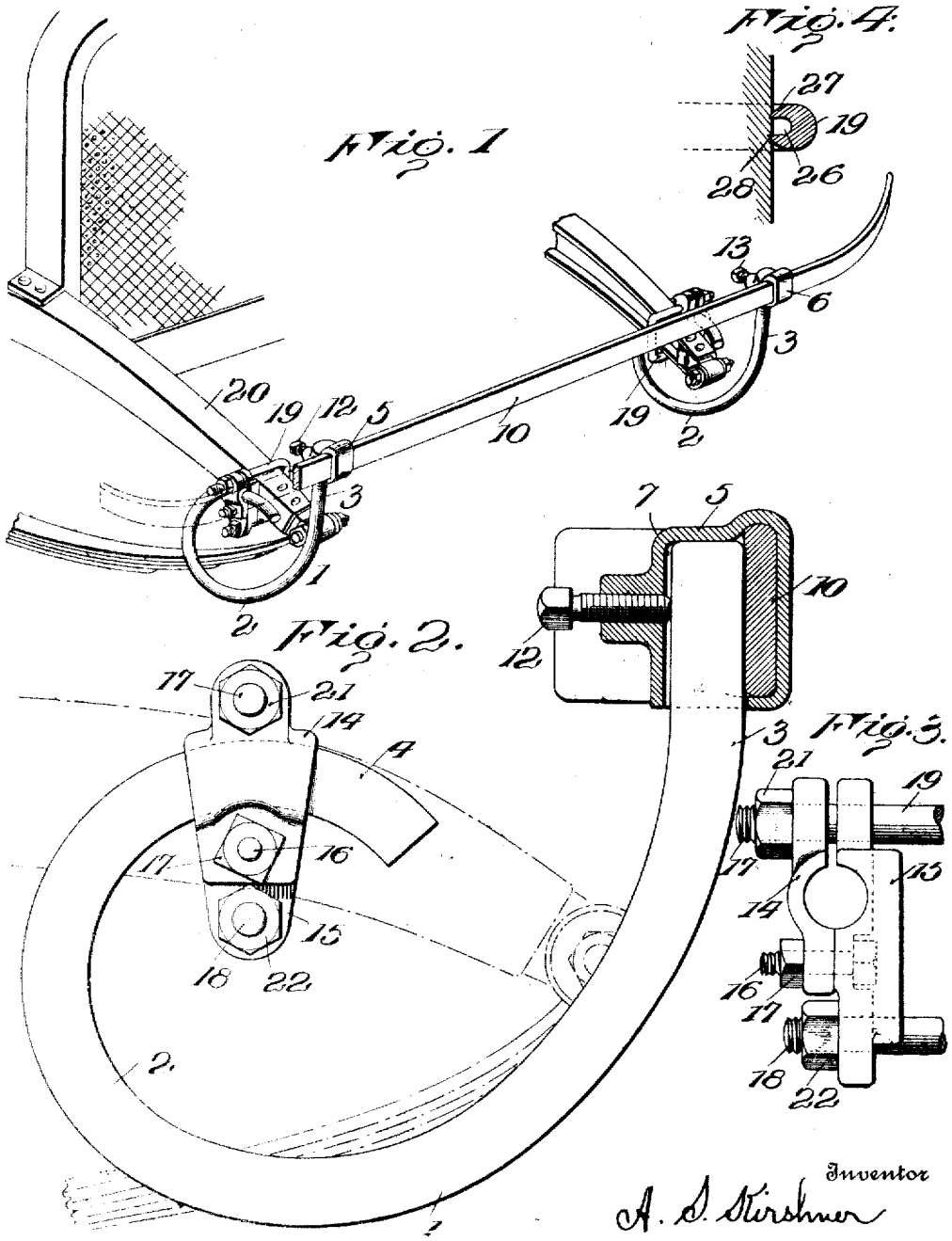

ABRAHAM S. KIRSHNER, OF PHILADELPHIA, PENNSYLVANIA, ASSIGNOR TO WILLIAM H. RAPEPORT, OF PHILADELPHIA, PENNSYLVANIA.

BUMPER FOR AUTOMOBILES.

1,270,844.  Specification of Letters Patent.  Patented July 2, 1918.

Application filed October 27, 1916. Serial No. 128,073.

*To all whom it may concern:*

Be it known that I, ABRAHAM S. KIRSHNER, a citizen of the United States, and a resident of Philadelphia, in the county of Philadelphia and State of Pennsylvania, have invented certain new and useful Improvements in Bumpers for Automobiles, of which the following is a specification.

This invention relates to improvements in automobile bumpers and the object of the invention is to provide a bumper exceedingly simple in construction and capable of being secured to various cars even though the different cars are equipped with frames not uniform in size or shape.

The invention consists in the automobile bumper shown, in its preferable embodiment, in the drawing accompanying and forming part hereof and which will be hereinafter fully described and claimed.

In the aforesaid drawing:

Figure 1 is a perspective view of part of the frame of an automobile having my invention applied thereto;

Fig. 2 is a side elevation with parts shown in section;

Figs. 3 and 4 are details.

Referring now to the details of the drawing by numerals: 1 and 2 designate springs which form the main part of my invention. Each of these springs has one of its ends vertically disposed as indicated by the numeral 3, while the other end of each spring is formed on the arc of a circle as shown at 4, the spring otherwise being of the general shape shown in Fig. 2. The free vertical ends of the two springs 1 and 2 are inserted in a pair of brackets 5 and 6, each of said brackets having a vertical aperture 7 to receive the vertically disposed ends 3 of the springs 1 and 2 and a horizontal recess through which is passed the bumper bar 10 as illustrated in Figs. 1 and 2. Set screws 12 and 13 are provided which pass through the brackets and co-act with the ends 3 of the springs 1 and 2 and thereby clamp said springs and the bumper bar 10 in the brackets, so that the springs and the bumper bar serve practically as one solid construction.

The other ends of the springs 1 and 2, designated 4, which have been described as being formed on the arc of a circle, are passed through clamps of the particular construction shown in Figs. 2 and 3. These clamps comprise two members 14 and 15 which are normally held together by means of a bolt 16 and nut 17. Above the bolt is a curved aperture to permit of the passage of the curved end 4 of the bumper spring. At the bottom of the member 15 and the top of both members 14 and 15 are bolt openings through which are passed the ends 17 and 18 of a U-shaped bolt 19. This U-shaped bolt is intended to have its members 17 and 18 pass above and below the upper section 20 of the frame of an automobile, the free ends of the bolt passing through the apertures in the clamping members 14 and 15, nuts 21 and 22 being provided to secure the parts together. It will be obvious that the upper nut 21 not only serves to secure the U-shaped bolt against the frame 20, but at the same time clamp the end 4 of the bumper spring between the clamping members 14 and 15. It will also be observed that after the nuts 21 and 22 are screwed as tight as is desirable to turn them, the bumper springs may be adjusted within the clamps by merely loosening the nut 21 which not only loosens the upper arm of the U-shaped bolt 19 but at the same time loosens the clamping member 14 to free the curved end of the bumper spring when said curved end may be adjusted as may be desirable. The inner surface of the U-shaped bolt is provided with a groove 26 which forms two sharp edges 27 and 28 adapted to more securely hold against the frame 20 when the nuts 21 and 22 are tightened.

As before stated the ends of the bumper springs are formed on the arc of a circle and therefore no matter what shape the frames of the automobiles may be, whether they are substantially flat, whether they project downward at a sharp angle, or whether they are mid-way between the horizontal and a sharp angle, the bumper springs may be readily adjusted in their clamps 14 and 15 so that the free ends 3 of the bumper springs, to which the bumper bar is secured, may always be in a substantially vertical position whereby the best spring effect is produced.

From the foregoing and the accompanying drawing it will be seen that I have invented an exceedingly simple form of bumper spring which is not only so simple that it cannot get out of order but is so constructed that it may readily be adjusted to hold the bumper bar in exactly the desired position.

What I claim as my invention is:

1. In a bumper for automobiles and in combination with the frame thereof, bumper springs each having one end formed on an arc of a circle, clamps for securing the arc-shaped ends of said springs to said frame, and a bumper bar secured to and supported by the free ends of said springs, the arc-shaped ends of said springs permitting the springs to be adjusted to obtain the best spring effect.

2. In a bumper for automobiles and in combination with the frame thereof, bumper springs each having one end formed on an arc of a circle, the free ends of said springs being substantially vertical, clamps for securing the arc-shaped ends of said springs to said frame, and a bumper bar secured to and supported by the free vertical ends of said springs, the arc-shaped ends of said springs permitting the springs to be adjusted to obtain the best spring effect.

3. In a bumper for automobiles and in combination with the frame thereof, bumper springs, each formed of a single piece of spring material having one end adapted to occupy a substantially vertical position, and the other end bent around over the body of the spring into an arc-shaped part, clamps for securing said arc-shaped ends to said frame, and a bumper bar secured to and supported by the free vertical ends of said springs, the arc-shaped ends of said springs permitting the springs to be adjusted to obtain the best spring effect.

4. In a bumper for automobiles and in combination with the frame thereof, a bumper spring, a clamp for securing said spring to said frame comprising two members between which the end of the spring is clamped, a bolt for holding said members in place, and a U-shaped bolt securing said clamp to said frame, one of the ends of said U-shaped bolt coöperating with the aforesaid bolt to clamp the spring between said clamping members.

5. In a bumper for automobiles and in combination with the frame thereof, a bumper spring, a clamp for securing said spring, and a U-shaped bolt for securing said clamp to said frame, said bolt having a recessed part having two gripping edges contacting with said frame.

In testimony whereof I affix my signature in presence of two witnesses.

ABRAM S. KIRSHNER.

Witnesses:
　ELIZABETH M. MARR,
　M. E. HARDING.